United States Patent [19]

Campbell et al.

[11] Patent Number: 4,747,652
[45] Date of Patent: May 31, 1988

[54] OPTICAL FIBER COUPLER

[75] Inventors: Bruce D. Campbell, Portola Valley; James T. Triplett, Livermore; Richard E. Tylor, Fremont, all of Calif.

[73] Assignee: Raychem Corporation, Menlo Park, Calif.

[21] Appl. No.: 614,884

[22] Filed: May 25, 1984

Related U.S. Application Data

[63] Continuation-in-part of Ser. No. 437,053, Oct. 27, 1982, which is a continuation-in-part of Ser. No. 370,321, Apr. 21, 1982, abandoned, which is a continuation-in-part of Ser. No. 258,079, Apr. 27, 1981, abandoned.

[51] Int. Cl.$^4$ .............................................. G02B 6/26
[52] U.S. Cl. ............................ 350/96.15; 350/96.16
[58] Field of Search ........................... 350/96.15, 96.16; 250/227; 455/610, 612

[56] References Cited

U.S. PATENT DOCUMENTS

| | | | |
|---|---|---|---|
| 3,864,019 | 2/1975 | Smolinsky et al. | 350/96.16 |
| 3,883,772 | 5/1975 | Waka et al. | 350/96.15 |
| 3,936,631 | 2/1976 | Muska | 350/96.15 |
| 3,982,123 | 9/1976 | Goell et al. | 250/227 |
| 4,072,400 | 2/1978 | Claypoole et al. | 350/96.30 |
| 4,089,584 | 5/1978 | Polczynski | 350/96.15 |
| 4,103,154 | 7/1978 | d'Auria et al. | 350/96.15 |
| 4,105,284 | 8/1978 | Olshansky | 350/96.33 |
| 4,277,168 | 7/1981 | Oku | 350/96.26 |
| 4,431,262 | 2/1984 | Tolles | 350/96.15 |
| 4,557,550 | 12/1985 | Beals et al. | 350/96.15 |
| 4,580,872 | 4/1986 | Bhatt et al. | 350/96.16 |
| 4,586,783 | 5/1986 | Campbell et al. | 350/96.15 |

FOREIGN PATENT DOCUMENTS 2100463 12/1982 United Kingdom .

Primary Examiner—William L. Sikes
Assistant Examiner—Frank González
Attorney, Agent, or Firm—Dennis E. Kovach; Herbert G. Burkard

[57] ABSTRACT

An optical fiber coupler for injecting light into, and withdrawing light from, an optical fiber utilizes a deformable material (8) and a clamping member (4) which clamp a buffered optical fiber (6) therebetween. Both the clamping member and deformable material are curved causing the optical fiber to be bent when so clamped resulting in light coupling between an optical fiber core and the deformable material through the fiber buffer. The deformable material is substantially transparent and has an index of refraction substantially equal to that of an outer surface of the optical fiber. A light element has a surface embedded within the deformable material, and the deformable material and coupler are specifically formed so as to reduce microbend stresses induced in the fiber when so clamped so as to increase coupling efficiency.

24 Claims, 4 Drawing Sheets

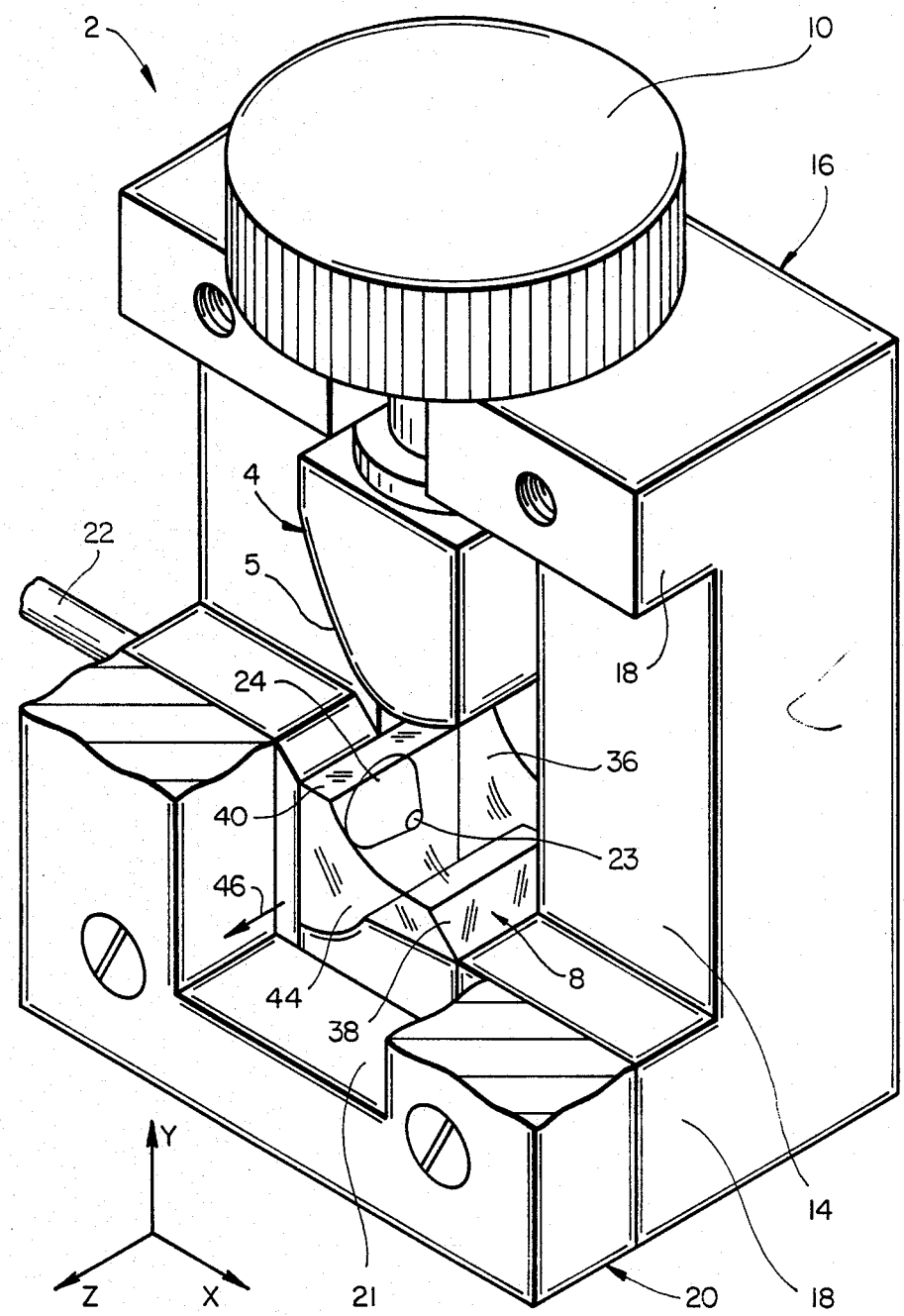
FIG_1

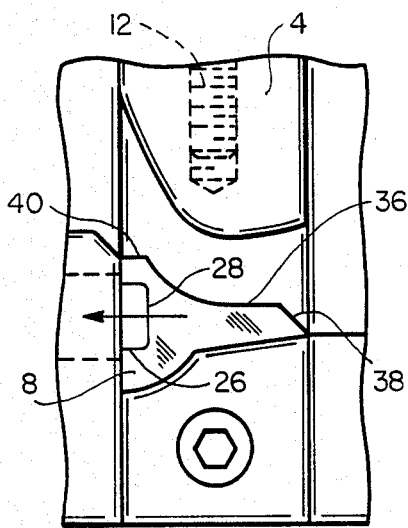
FIG_2
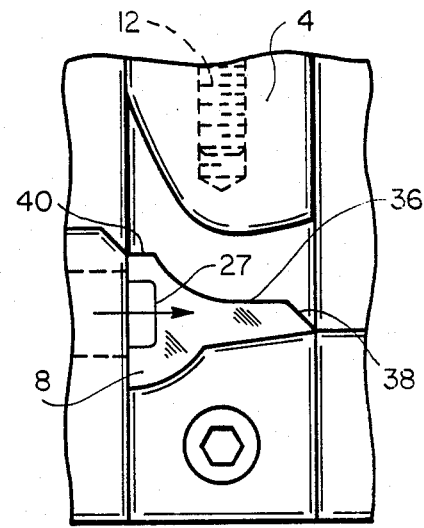
FIG_3
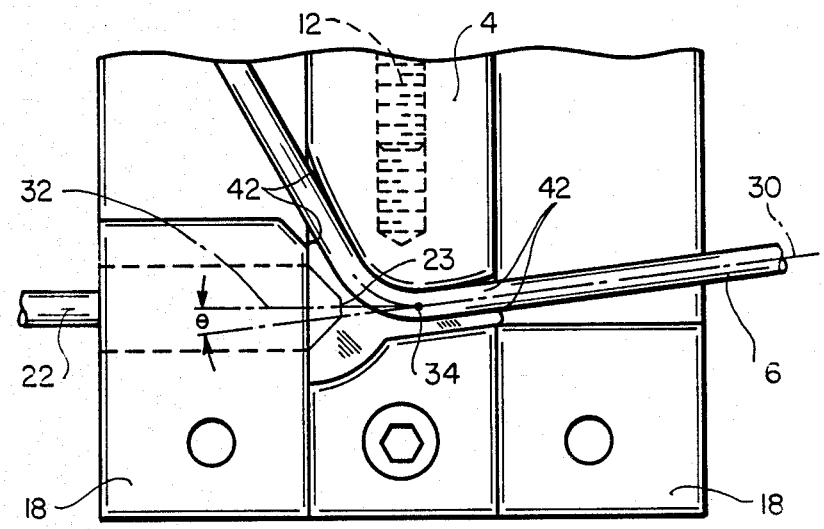
FIG_4

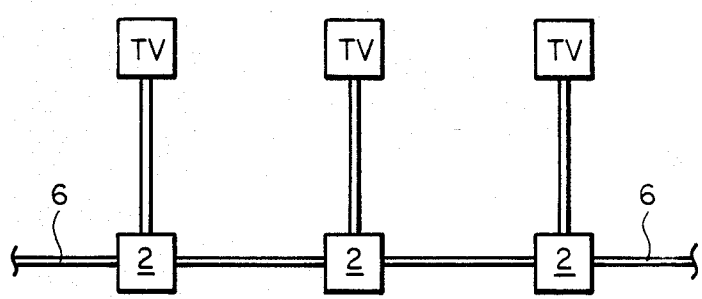
FIG_5
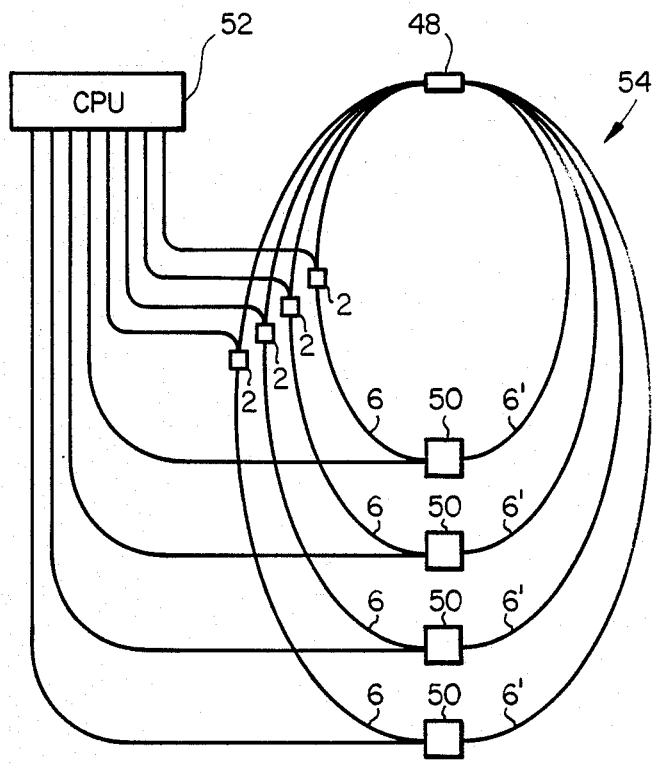
FIG_6

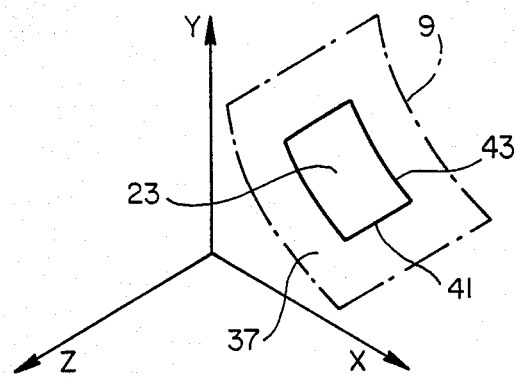
FIG_7
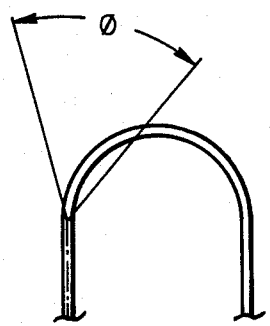
FIG_8
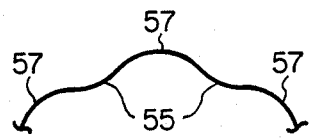
FIG_9

OPTICAL FIBER COUPLER

CROSS-REFERENCES TO RELATED APPLICATIONS

This application is a continuation-in-part of co-pending application Ser. No. 437,053 filed Oct. 27, 1982; which is a continuation-in-part of application Ser. No. 370,321 filed Apr. 21, 1982, now abandoned; which is a continuation-in-part of application Ser. No. 258,079 filed Apr. 27, 1981, now abandoned. The entire disclosures of these three related applications are incorporated herein by reference.

BACKGROUND OF THE INVENTION

I. Field of the Invention

The present invention relates to an apparatus for coupling optical signals into and out of an optical fiber through a moisture barrier layer thereof.

II. Description of the Prior Art

Optical fibers comprising an optical waveguide capable of transmitting light therein are used for transferring information in the form of light pulses, and a variety of means are known for injecting light into such optical fibers representative of the information to be transmitted as well as tapping light from such optical fibers for receiving such information. The most common type of devices for injecting light into, and for tapping light from, such optical fibers include means wherein the light is injected into an axial end face of a core of the waveguide, and means for receiving light from an opposite axial end face of the core of the waveguide. Such devices are disadvantageous in that termination of the waveguide is required to transmit or receive light.

Several devices are also known for injecting light into and tapping light from optical fibers through a side surface thereof so as not to require termination of the waveguide. In the case of devices for injecting light into a fiber which comprises a glass core, a glass cladding surrounding the core which together forms the optical waveguide or light guiding region, and a buffer which surrounds the cladding to protect both the cladding and core from moisture, it is common in the art to strip the buffer off of the optical fiber to facilitate injection or tapping of light into or from the core and cladding, and such a stripping practice is common with a variety of optical fiber taps, as evidenced by the teachings of Jeunhomme, U.S. Pat. No. 4,253,727; Goell, U.S. Pat. No. 3,982,123; Miller, U.S. Pat. No. 3,931,518; etc. Such devices are disadvantageous in that stripping the buffer off of the cladding exposes the cladding to moisture in the atmosphere which causes microcracks in the cladding to grow which rapidly deteriorates the strength of the optical fiber resulting in premature failure thereof.

In addition, through Cross, U.S. Pat. No. 4,270,839 describes a device wherein light can be tapped, as opposed to injected, from an optical fiber wherein the buffer can be retained thereon, the device described by Cross presents several additional disadvantages. In particular, according to the construction of this device, an optical fiber 1 is embedded within a slot contained in a light pipe 5, and the slot is subsequently filled with an epoxy solution which is cured to permanently bind the fiber within the light pipe. Thereafter, the fiber is bent in an area removed from the light pipe so as to convert core light modes into cladding and buffer light modes which are subsequently stripped therefrom by the light pipe 5 and epoxy 12. Such a construction requires the use of a relatively long light pipe 5, requires the use of an epoxy solution which potentially is toxic and can be spilled, and is furthermore not releaseable or easily adapted for in-the-field use.

Accordingly, a need exists in the art for an improved light coupler which can either inject light into or tap light from an optical fiber, or perform both light injecting and tapping functions, without removing any moisture barrier of the optical fiber, and which is releaseable and has a simplified construction.

SUMMARY OF THE INVENTION

In view of the above, an object of the present invention is to provide an optical coupler capable of injecting light into and/or tapping light from, an optical fiber without requiring that a moisture barrier thereon be removed.

A further object of the invention is the provision of such a coupler which is releaseable and capable of injecting, or alternatively tapping, a relatively large optical signal relative to a signal amount attenuated or lost due to the presence of the coupler.

These and other objects of the invention are achieved by the provision of an optical coupler which includes a solid elastically deformable material, a clamping member, and means for pressing an optical fiber between the clamping member and the deformable material. The optical fiber, when clamped, is bent so as to facilitate injection of light into the fiber through its moisture barrier or collection of light from the optical fiber through its moisture barrier.

In the case of light injection, a light source has a light emitting surface which is completely embedded within the deformable material which is precisely located at a position where an optimum amount of light can be injected into the optical fiber. In the case of light tapping, a light collection surface is completely embedded within the deformable material in a vicinity where an optimum amount of light can be collected from the optical fiber.

The shape of the clamping member and deformable material are specially formed, as well as a casing and cover therefore, so as to minimize light loss caused by microbending stresses in the fiber which would otherwise by induced in the optical fiber, and also so as to minimize optical losses due to other various phenomena.

Further embodiments are described wherein the deformable material is replaced by a non-deformable material so that an end surface of a light collecting or light emitting waveguide can be made flush with a surface of the non-deformable material which confronts the opical fiber being coupled. Such an arrangement achieves excellent coupling efficiency, which has particular advantages in embodiments where a series of couplers are attached to the fiber being coupled in order to increase a percentage of light being tapped from or injected into the coupled fiber.

BRIEF DESCRIPTION OF THE DRAWINGS

FIG. 1 is a perspective view of an optical coupler of the present invention, which coupler includes a light collecting optical fiber for collecting tapped light and for injecting light into a coupled optical fiber;

FIG. 2 is a plan view of an optical coupler similar to that of FIG. 1, except that a photodetector is utilized for collecting tapped light;

FIG. 3 is a plan view of an optical coupler similar to that of FIG. 1 except that a light emitter, such as a photodiode, is embedded within a deformable material rather than a light collecting optical fiber, such an optical coupler being suitable for injecting light rather than tapping light, into an optical fiber;

FIG. 4 is a plan view of the optical coupler of FIG. 1;

FIG. 5 illustrates a cable television network utilizing optical couplers of the present invention;

FIG. 6 illustrates a local area network incorporating optical couplers of the present invention for collision detection;

FIG. 7 illustrates a preferred shape of an end surface of a light coupling waveguide which is flush with a non-deformable coupling material;

FIG. 8 illustrates an area over which a principle amount of light is tapped from a bent optical fiber; and FIG. 9 illustrates a plurality of optical couplers arranged in series for achieving increased coupling efficiency with an optical fiber.

DESCRIPTION OF THE PREFERRED EMBODIMENTS

FIGS. 1 and 4 illustrate views of a first embodiment of an optical power coupler 2 constructed according to the present invention. In FIG. 1, a clamp member 4 is illustrated in its upper-most position whereas in FIG. 4 the clamp member 4 is in its lower-most position whereat an optical fiber 6 is clamped between the clamp member 4 and a solid elastic deformable index-matching material 8. In the embodiment of FIGS. 1 and 4, a light collecting/light injecting optical waveguide 22 is used to collect or inject light into or from a fiber 6, whereas in the embodiment of FIG. 2, in the case of light collection, reference numeral 26 illustrates a photodetector for collecting light or power tapped from the fiber 6. In FIG. 3, the photodetector of FIG. 2 has been replaced with a light emitter, such as photodiode (27), which emits light into the optical fiber 6.

The optical fiber 6, from which power or light is to be tapped, or into which power or light is to be injected, can be any type of optical fiber. The most common types for which the coupler of the invention is most suitable is a plastic clad silica (PCS) fiber and a glass-on-glass fiber.

In the case of a PCS fiber, a plastic cladding functions to form an optical waveguide in conjunction with a core of the fiber, and further functions to prevent moisture from attacking the core. Since some light energy is always present in a fiber cladding even though most of the light energy is contained in the fiber core, the plastic cladding forms part of a light guiding region of the core and also functions as a moisture barrier.

In the case of a glass-on-glass fiber, the cladding, like the core, is made of glass, and a third layer is used to coat the cladding to protect both the cladding and core from moisture. This third layer is commonly referred to in the art as a buffer. Accordingly, the glass core and cladding form the light guiding region, and the buffer forms the moisture barrier.

Hereinafter, whenever a buffer is referred to, it is explicitly understood that an optical fiber having three distinct layers is intended, e.g., a core, a cladding, and a buffer layer distinct from the cladding, though reference to a buffer is not intended to explicitly require that both the core and cladding be made of glass even though this is often the case. Other types of optical fibers are known in the art, and the optical coupler of the invention can be used therewith, though reference hereinafter will not be made specifically for such fibers since PCS and buffered fibers are the most common types of fibers in use today. Hereinafter when reference is made to an outer surface or moisture barrier layer of the optical fiber 6, in the case of a buffered fiber, such as a glass-on-glass fiber, the outer surface or moisture barrier layer corresponds to the buffer on the cladding, and in the case of PCS fibers, the outer surface or moisture barrier layer corresponds the plastic cladding.

Referring again to FIGS. 1–4, the clamp member 4 is raised and lowered by turning knob 10 which turns screw 12 engaged with screw threads contained within the clamp member 4. The pitch of the screw threads and size of the knob 10 are so chosen such that an amount of pressure exerted on the fiber 6 by the clamp member 4 and the deformable material 8 can be precisely controlled, as desired. It should be appreciated that other means functionally equivalent to the knob 10 and screw 12 could likewise be utilized to exert a controlled amount of pressure on the fiber 6.

The clamp member 4 preferably is made of a material having an index of refraction substantially lower than that of the outer surface of the fiber 6 so that a minimum amount of light will escape the outer surface of the fiber 6 into the clamp member 4, and most preferably the clamp member is made of an opaque material thus further limiting the amount of light loss to the clamp member 4. Furthermore, the clamp member preferably should be made of a relatively non-resilient material so that the fiber 6 will tend to bend along a curve defined by a lower surface 5 of the clamp member.

In use, the fiber 6 is inserted into the coupler 2 through a first opening 14 defined by casing 16 having upper and lower flanges 18 and a cover 20, the cover being only partially illustrated in FIG. 1 so as to expose an interior construction of the coupler 2. With this construction, for the case of tapping optical power from a light-carrying fiber 6, the fiber 6 is clamped between the clamping member 4 and the deformable material 8 by turning knob 10 thus lowering the clamp member 4 until a desired amount of pressure is exerted on the fiber 6, and light thus exits the fiber 6 and enters the deformable material 8 and is collected by a light collecting surface 23 of a relatively fat optical fiber 22 (FIGS. 1 and 4) or a light collecting surface 28 of a photodetector 26 (FIG. 2). This light is caused to leave the fiber 6 since it is bent by the clamping member 4 and deformable material 8 to such an extent that a critical angle of some or all of the light modes (in the case of multimode fibers) in the fiber 6 is exceeded as is well understood in the art. Light can also be tapped (or injected) into a single mode fiber using the coupler 2 so long as the fiber is sufficiently bent to exceed the critical angle of the single mode fiber.

Though the coupler of the invention will function if the radius of curvature of the lower surface 5 of the clamping member 4 is uniform, superior and optimum coupling efficiency is obtained if the radius of curvature of the lower surface 5 of the clamping member 4 is nonuniform, with optimum shapes of the lower surface 5 being parabolic or hyperbolic. Forming the lower surface 5 so as to have a nonuniform radius of curvatures significantly localizes an area or volume around which the fiber 6 is bent so that light within the deformable material 8 which can be coupled with the core of the fiber 6 is concentrated within a relatively small volume. This allows the use of extremely small light collection (or light emitting) surfaces, especially when these surfaces are located within the deformable material 8 and relatively close to the fiber 6.

The light collecting/light emitting optical waveguide 22 of FIGS. 1 and 4 can have a variety of configurations, for example, the waveguide 22 can simply comprise a single relatively fat optical fiber 22 having a waveguide diameter of say 1000 micrometers, for example, a plastic core-plastic clad fiber, though smaller optical fibers can be used for the waveguide 22 if desired. Preferably, an end surface 23 of the waveguide 22 is made non-circular so that the surface 23 can be optimumly shaped to achieve optimum light coupling with fiber 6, e.g., the end surface 23 can be shaped so as to occupy a volume of space having a relatively dense amount of light leaking from the fiber 6 when the fiber 6 is bent. The waveguide 22 functions to collect light escaping from the core of the optical fiber 6 when the fiber 6 is clamped and bent by the clamping member 4 and the deformable material 8, as explained previously. Alternatively, the waveguide 22 can be connected to a remote light source (not shown) for injecting light into the fiber 6.

In the case of the embodiment of FIG. 2, light collection is affected by utilizing a photodetector 26 having a light collection surface 28 for only collecting light escaping from the fiber 6 as it is bent, and FIG. 3 illustrates a light emitter 27 for only injecting light.

The light collecting surface 23, 28 or light emitting surface 23, 27 is precisely positioned within the deformable material 8 with an aim towards maximizing an amount of light collected thereon from the fiber 6 or injected therefrom into the fiber 6 due to the bending of the optical fiber 6 by the clamping member 4. To this end, it is preferable to place the light collecting or injecting surfaces 23, 27, 28 within the deformable material 8 as close as possible to the optical fiber 6 and yet at a position where optimum coupling with the optical fiber 6 is achieved. Experiments have shown that optimum coupling deficiency is obtained if a line 32, interconnecting a center point of the light collecting surface 23, 28 and a point 34 where a center line 30 of an unbent portion of the fiber 6 exits the fiber due to the bend induced therein, forms an angle ($\theta$) with the center line of between 0° and 20°, more preferably between 3° and 12°, most preferably between 5° and 9°, with excellent results being obtained when $\theta$ is about 7°. The exact optimum value of $\theta$ varies within ± a couple of degrees by moving the surfaces 23, 27, 28 towards or away from the point 34 substantially along the line 32, and best coupling efficiency is obtained when the surface 23, 27, 28 is positioned as close as physically possible to the point 34 without any portion of the light collector 22, 26, or sleeve 24 protruding through the deformable material 28 when it is put under maximum pressure by the knob 10, screw 12, clamp member 4, so as not to damage the fiber 6. Obviously, the entire 0°-20° range can be adequately covered if plural waveguides 22 are used, if desired. With such a construction, photodetectors or photodiodes having light collecting/light emitting surfaces as small as 0.0048 square inches can be used.

Another important aspect of the invention is the physical and chemical characteristics of the deformable material 8. Preferably, the deformable material 8 has an index of refraction compatible with an index of refraction of the outer surface of the optical fiber 6, which in the case of a glass-on-glass fiber would be the fiber buffer, and in the case of PCS fiber would be the plastic cladding. The index of refraction of the deformable material 8 should be substantially equal to the index of refraction of the outer surface of the fiber 6 so as to optically eliminate an interface between the deformable material 8 and the outer surface of the fiber 6 to achieved optimum coupling therebetween. If the coupler is to be used to primarily tap light from the fiber 6, the deformable material should have an index of refraction equal to or greater than the outer surface of the fiber 6, whereas if the coupler is to be used to primarily inject light into the fiber 6, the deformable material should have an index of refraction equal to or lower than that of the outer surface of the fiber 6.

The deformable material 8 should be sufficiently deformable so as to conform to a limited extent to the outer surface of the optical fiber 6 when the optical fiber 6 is clamped between the deformable material 8 and the clamping member 4. It is not desirable for the deformable material 8 to be excessively deformable since this results in an undue proportion of an outer circumferential surface of the optical fiber 6 being contained within the deformable material 8 which results in an undue proportion of light exiting the optical fiber 6 missing the limited-size light-collecting surface 23, 28 in the case of light tapping, and also renders the coupler somewhat unstable. Preferably a Shore A hardness of the deformable material 8 is between 45 and 70, more preferably between 48 and 65, with optimum results being obtained when it is between 48 and 55, e.g., 50. Good results have been obtained using RTV 655, a high-strength transparent silicone rubber compound made by General Electric, this compound having a Shore A hardness of 50.

A shape of an upper surface 36 of the deformable material 8 can be optimized so as to optimize an amount of light collected by light collecting surfaces 23, 28. Though it is possible to use a planar upper surface 36 in conjunction with a curved surface 5 of a clamping member 4 to bend the fiber 6 to achieve the desired light coupling, it has been found that far superior results are obtainable if the upper surface 36 of the deformable material 8 is carefully formed to avoid any unnecessary microbend stresses from being imposed on the fiber 6 in an area thereof somewhat removed from the light surfaces 23, 27, 28 since such microbends caused by such stresses result in unwanted attenuation and reduced coupling efficiency.

In particular, it has been found that optimum results are obtainable if the upper surface 36 of the deformable material 8 is curved, and in particular is curved so as to have a nonuniform radius of curvatures, and further in particular if the shape of the curved surface 36 is shaped so as to substantially match or conform to the shape of the surface 5 of the clamping member 4 at least in an area closely adjacent point 34 where the fiber 6 is bent relatively sharply. In addition, it has further been discovered that the far superior results are obtainable if surfaces 38, 40 on opposite longitudinal ends of the deformable material 8 adjacent sections of the deformable material 8 where the fiber 6 enters and exits a space between the clamping member 4 and the deformable material 8 are tapered. Such tapering of the surfaces 38, 40 prevents, or at least minimizes, microbending stresses from being induced in the optical fiber 6 at points 42, as illustrated in FIG. 4. As indicated, such microbending stresses are counterproductive to optical coupling since they result in increased attenuation within the fiber 6.

A further novel feature of the invention is the provision of a window 21 in cover 20 adjacent a lateral face 44 of the deformable material 8, which window confronts both the deformable material 8 and the optical fiber 6. The window 21 allows the deformable material 8 to expand along a direction indicated by arrow 46 when pressure is exerted on the deformable material 8 by the optical fiber 6 and clamping member 4. Such expansion along the direction indicated by the arrow 46 is desirable to further reduce microbend stresses induced in the optical fiber 6 thus increasing overall optical coupling.

According to further embodiments of the present invention, the deformable material 8 is replaced with a non-deformable material 9, e.g., a material having a Young's modulus or Shore A hardness approximately equal to or greater than that of the light guiding region of the optical fiber 6 so that the non-deformable material is substantially non-deformable, as is the clamping member 4. If the non-deformable material 9 is utilized rather than the deformable material 8, a light collecting/light emitting surface 23 of the waveguide 22 can be positioned on an upper surface of the non-deformable material facing the fiber 6 so as to be flush with this upper surface. In this case, the pressure exerted on the fiber 6 by the clamping member 4 causes the buffer of the fiber 6 to deform slightly over the light collecting/light emitting surface 23 of the waveguide 22 thus achieving the desired optical coupling betewen the fiber 6 and the waveguide 22. Since the buffer (or plastic cladding in the case of PCS fiber) of the fiber 6 deforms slightly so as to conform to the shape of the surface 23 of the waveguide 22, any air gap therebetween is substantially eliminated thus achieving good optical coupling between the waveguide 22 and the fiber 6.

When the surface 23 is flush with the upper surface of the non-deformable material 9, it is preferable to shape the surface 23 and this upper surface to achieved optimum coupling, and in particular to curve the surface 23 along X, Y, and Z axes (FIGS. 1 and 7) so that it will substantially conform to the outer surface of the fiber 6 when clamped by the clamping member 4. The exact optimum shape of the surface 23 is dependent on the shape of the lower surface 5 of the clamping member 4 and numerical aperature of the fiber 6, this shape being strongly dependent on the minimum bending radius imposed on the fiber 6 by the clamping member 4.

As an example, assuming a minimum bending radius of 3 mm and a 1000-micron-diameter light-collecting fiber 22, it has been determined that good coupling efficiency is obtained if the surface 23 is deformed and curved along the X, Y, and Z axes such that an outer perimeter of the surface 23 is substantially rectangular in a curved plane, with a length of a side 41 of the rectangle being approximately 0.2 mm along the Z direction, and a length of another side 43 of the rectangle being approximately 3 mm in the X,Y plane as generally illustrated in FIG. 7. Obviously, in the case of a non-deformable material 9, the shape of the upper surface thereof should necessarily be curved rather than planar, and in particular be specially form so that the fiber 6 tends to contact the waveguide surface 23.

With the waveguide surface 23 flush with the non-deformable material upper surface 37, attenuation losses of the coupler can be kept to an absolute minimum even when extremely small area surfaces 23 are utilized, such attenuation losses between 0.15 dB and 0.25 dB for an optical coupler capable of tapping approximately 50% of the light in the fiber 6 with similar results being achieveable for light injection.

Even higher percentages of light can be tapped/injected from/into the fiber 6 if multiple couplers 2 are utilzed in series, with the fiber 6 being bent between couplers to achieve mode mixing wherein relatively low order light modes are converted into higher order light modes in the fiber 6. In particular, it has been found that when a fiber 6 is bent along an arc of say 180° as illustrated in FIG. 8, most of the light tapped therefrom exits the fiber over an arc $\phi$ between 75° to 90° since it is the highest order modes which tend to be initially tapped at the initial point of fiber bending, with lower order modes remaining in the fiber throughout the arc of the fiber curve. Lower order modes which are not initially tapped can be converted into higher order modes if the fiber 6 is reverse-bent a predetermined amount, as illustrated by sections 55 in FIG. 9, with optical couplers 2 being provided along the fiber 6 at sections 57. Assuming 50% of the light in the fiber 6 is tapped and collected at each bend 57, and that lower order modes are converted into higher order modes at sections 55 so as to allow downstream optical couplers to tap approximately 50% of the light as indicated, it can easily be shown that five optical taps 57 can collect approximately 95% of the light or power in the optical fiber 6.

In the case of the use of multiple optical couplers 2 for tapping larger percentages of light from the optical fiber 6, opposite ends of the light collecting optical waveguides 22 can all be connected onto a surface of a light detector such as a photodetector. Assuming the waveguides 22 each comprise 1000 micron diameter optical fibers, it can easily be shown that an area of the photodetector can be as small as approximately 7 square mm.

In operation, an optical fiber 6 having power therein to be tapped is loosely inserted between the deformable material 8 (or non-deformable material 9) and the clamping member 4 with the clamping member 4 in its raised position, and thereafter knob 10 is turned thus lowering the clamping member 4 a sufficient distance downward to impose a desired amount of stress on the optical fiber 6. As pressure is increasingly exerted on the optical fiber 6, an amount of power tapped therefrom tends to increase due to increased conformance between the upper surface 36 of the deformable material 8 and the outer surface of the fiber 6 until a maximum light collection value is obtained. Thereafter, increased pressure on the fiber 6 tends to decrease the amount of light or power collected, the decrease being primarily associated with an increase in microbending stresses being applied to the fiber 6 at points too far removed from the light collecting surface 23, 28. This decrease is also principally attributed to an unacceptably high degree of conformance between upper surface 36 of the deformable material 8 and the outer surface of the fiber 6 which causes an increased proportion of light modes having a directional component parallel to arrow 46 to miss the light collection surfaces 23, 28. If desired, feedback control means can be incorporated into the coupler 2, and more specifically the tap, to detect the amount of power being collected so as to automatically adjust the position of the clamping member 4 to obtain optimum clamping pressure.

The coupler 2 operates in the same manner for light injection into the fiber 6, e.g., the fiber 6 is clamped between the clamp member 4 and deformable material 8 until an optimum amount of pressure is exerted on the fiber 6, and light is injected into the fiber 6 through its outer surface from the fiber 22 (FIGS. 1 and 4) or from the light emitter 27 (FIG. 3).

FIG. 5 illustrates a practical embodiment incorporating an optical coupler of the invention wherein a continuous length of fiber 6 is repeatedly fed through a plurality of optical couplers 2 so that a small portion of the optical power contained within the fiber 6 is tapped therefrom and transferred to an apparatus which utilizes information represented by such optical power, for example televisions, as would be used in a cable television network.

FIG. 6 illustrates another practical utilization of the optical coupler 2 of the present invention. In FIG. 6, reference numeral 50 represents various pieces of equipment such as computers, which generate data in the form of optical signals transmitted along optical fibers 6 to other pieces of equipment 50 in a network 54 via a star coupler 48. In particular, each optical fiber 6 extending from each piece of equipment 50 is interconnected at the star coupler 48 such that any optical signal transmitted by any one of the optical fibers 6 is mixed in the star coupler such that the optical fibers 6' exiting from the star coupler each carry optical signals representative of the information fed into the star coupler 48, and hence this information is received by each of the pieces of equipment 50.

A problem exists in the art in that where more than one piece of equipment 50 generates an optical signal and transmits it down its optical fiber 6 such that more than one optical signal is received in the star coupler at substantially the same moment, the plurality of signals received are scrambled and mixed, and the resulting information fed to the optical fibers 6' exiting the star coupler 48 is not representative of the information generated by any one of the pieces of equipment 50. Accordingly, a need exists to detect when such a phenomena occurs, such as a collision detection system. In FIG. 6, each of the optical fibers 6 is connected to the optical coupler 2 described above, and each of the optical couplers 2 is in turn connected to a central processing unit 52. The central processing unit 52 is in turn connected to each of the pieces of equipment 50, and when the central processing unit determines that signals are being transmitted on more than one of the optical fibers 6 such that collisions can occur within the star coupler 48, the central processing unit generates signals to those pieces of equipment generating the optical signals which in turn regenerate their respective optical signals at a random future time.

Although the present invention has been described in considerable detail with respect to certain versions, other versions are possible. Therefore, the spirit and scope of the appended claims should not necessarily be limited to the preferred versions contained herein.

We claim:

1. An optical coupler for coupling light between an optical fiber and a light element through an outer moisture barrier layer of an intermediate portion of an optical fiber without damaging said fiber, said fiber comprising a light guiding region and said outer moisture barrier layer which provides mechanical strength for said light guiding region and keeps moisture therefrom, comprising:

a solid material for facilitating optical coupling with said moisture barrier layer;

a member disposed opposite said solid material, said fiber being disposed between said member and said material;

means for exerting pressure between said member and said solid material so as to bend said intermediate portion of said fiber therebetween;

said member having a curved surface confronting a first moisture barrier layer surface of said intermediate portion of said fiber such that said intermediate portion of said fiber is bent by said member and said solid material when pressure is exerted therebetween by said pressure exerting means; and a light element having an end surface completely embedded within said deformable material, said light element comprising a waveguide having an end surface completely embedded within said solid material, said waveguide extending out of a casing of said optical coupler, said waveguide being capable of injecting light into or tapping light from said intermediate portion of said optical fiber having said moisture barrier layer thereon.

2. The optical coupler of claim 1, said solid material having a curved surface which confronts and contacts a second moisture barrier layer surface of said intermediate portion of said fiber when said pressure is exerted.

3. The optical coupler of claim 2, said member curved surface having a nonuniform radius of curvature.

4. The optical coupler of claim 3, said member curved surface being shaped into a curve selected from the group of curves consisting of parabolas and hyperbolas.

5. The optical coupler of claim 3, said member curved surface having a Young's modulus at least as large as a second material forming said fiber light guiding region, said solid material curved surface having a surface hardness less than said second material so that said solid material is deformed by said fiber when said pressure is exerted by said pressure exerting means, a Shore A hardness value of said solid material surface being between 45 and 70.

6. The optical coupler of claim 5, said Shore A value being between 48 and 55.

7. The optical coupler of claim 3, said solid material having an index of refraction substantially equal to or greater than an index of refraction of said moisture barrier layer, said solid material being substantially transparent.

8. The optical coupler of claim 3, said solid material having an index of refraction substantially equal to or less than an index of refraction of said moisture barrier layer, said solid material being substantially transparent.

9. The optical coupler of claim 1, said waveguide comprising a second optical fiber.

10. The optical coupler of claim 2, said pressure exerting means including means for completely releasing said pressure exerted on said intermediate portion of said fiber, said pressure exerting means further including means for effecting relative movement between said member and said deformable material, said relative effecting moving means including means for varying said pressure.

11. The optical coupler of claim 10, said relative effecting moving means comprising a screw having one end embedded on screw threads in said member, and a knob connected to an opposite end of said screw for turning said screw.

12. The optical coupler of claim 2, further comprising means for interpreting information represented by light tapped from said intermediate portion of said optical fiber.

13. The optical coupler of claim 12, said information interpreting means comprising a video component.

14. The optical coupler of claim 12, said information interpreting means including means for determining when more than one of a plurality of optical fibers of a star coupler are attempting to substantially, simultaneously transmit light into an optically interconnected section of said plurality of optical fibers.

15. The optical coupler of claim 9, said second optical fiber having a light guiding region less than 1000 microns in diameter.

16. The optical coupler of claim 2, said light guiding region comprising a glass core surrounded by a glass cladding having an index of refraction lower than that of said core, said outer moisture barrier layer comprising a buffer surrounding said glass cladding.

17. The optical coupler of claim 2, said light guiding region comprising a core and a plastic cladding, said plastic cladding corresponding to said outer moisture barrier layer.

18. The optical coupler of claim 1, said end surface (23, 28) of said light element (22, 26, 27) being located within said solid material (8) at a location such that a line (32) interconnecting a center point of said end surface and a second point (34) where a center line (30) of an unbent portion of said fiber (6) departs from a center line of a bent portion of said fiber when said pressure is exerted forms an angle ($\theta$) with said unbent center line of between 0 and 20 degrees.

19. The optical coupler of claim 2, said light element conprising a light emitter having a light emitting surface completely embedded with said deformable material.

20. An optical coupler for coupling light between an optical fiber and a light element through an outer moisture barrier layer of an intermediate portion of an optical fiber without damaging said fiber, said fiber comprising a light guiding region and said outer moisture barrier layer which provides mechanical strength for said light guiding region and keeps moisture therefrom, comprising:

a solid material for facilitating optical coupling with said moisture barrier layer, said material having a curved surface confronting a first moisture barrier layer surface of said intermediate portion of said fiber;

a member disposed opposite said solid material, said fiber being disposed between said member and said material;

means for exerting pressure between said member and said material so as to bend said intermediate portion of said fiber therebetween;

said member having a curved surface confronting a second moisture barrier layer surface of said intermediate portion of said fiber such that said intermediate portion of said fiber is bent by said member and said material when pressure is exerted therebetween by said means for exerting pressure; and a light element having an end surface substantially flush with said curved material surface.

21. The optical coupler of claim 20, said member curved surface having a nonuniform radius of curvature.

22. The optical coupler of claim 21, said member curved surface being shaped into a curved selected from the group of curves consisting of parabolas and hyperbolas.

23. The optical coupler of claim 21, said end surface of said light element being curved, said light element comprising a waveguide.

24. The optical coupler of claim 23, said waveguide comprising a second optical fiber having a deformed end surface corresponding to said light element end surface.

* * * * *